United States Patent [19]

Kraus

[11] 4,333,692

[45] Jun. 8, 1982

[54] HYDROSTATIC AXIAL THRUST BEARING

[75] Inventor: Charles E. Kraus, Austin, Tex.

[73] Assignee: Excelermatic Inc., Austin, Tex.

[21] Appl. No.: 213,414

[22] Filed: Dec. 5, 1980

[51] Int. Cl.³ .............................................. F16C 32/06
[52] U.S. Cl. ...................................... 308/9; 308/170;
308/207 R
[58] Field of Search ......... 308/9, 170, 207 R, DIG. 1,
308/172, 160, 164

[56] References Cited

U.S. PATENT DOCUMENTS

| 3,143,381 | 8/1964 | Vurpillot | 308/170 |
| 3,451,731 | 6/1969 | Weichsel | 308/170 |
| 4,174,136 | 11/1979 | Hallstedt | 308/9 |
| 4,310,204 | 1/1982 | Christ et al. | 308/9 |

Primary Examiner—Lenard A. Footland

Attorney, Agent, or Firm—Klaus J. Bach

[57] ABSTRACT

An axial thrust bearing having opposite support and load members and formed between the support and load members of a bearing cavity to which pressurized fluid is supplied. The cavity is surrounded by an axially movable floating seal ring disposed in a groove in one of the members. In the center of the cavity there is arranged a valve disc covering a vent passage in the support member, being axially movably supported by the load member. Resilient means are associated with the valve disc forcing it toward the support disc into its normal axial end position given by the load member such that during load peaks the load member is permitted to approach the support member beyond the normal position of the valve disc, while the valve disc is forced by the resilient means onto the vent opening to dampen the movement of the load member toward the support member.

8 Claims, 2 Drawing Figures

U.S. Patent          Jun. 8, 1982          4,333,692

HYDROSTATIC AXIAL THRUST BEARING

BACKGROUND OF THE INVENTION

1. Field of the Invention

The invention relates to a hydrostatic axial thrust bearing for suporting variable loads.

2. Description of the Prior Art

A hydrostatic axial thrust bearing consists of a support member and a load member disposed adjacent the support member with a cavity formed between the two members to which cavity pressurized fluid is supplied for supporting the load member on the support member. The load member is maintained floating at a predetermined distance from the support member by the fluid in the cavity.

These bearings operate with little friction and can operate at very high speeds but they are sensitive to sudden loads as the opposed surfaces of the load and support members may then momentarily contact each other resulting in damage to the bearing surfaces.

SUMMARY OF THE INVENTION

To prevent damage to the bearing surfaces by suddenly occurring bearing loads, the load and support members of the axial thrust bearing are spaced relatively far apart, the pressurized fluid cavity between the load and support members being defined by an axially movable seal ring. A central vent opening is provided in the support member which is covered by a valve disc axially movably supported by the load member. Spring means are disposed behind the valve disc forcing the valve disc toward the load member into a seating position defined by the load member.

With this arrangement there is provided a relatively large distance between the support and the load surfaces and the load member is permitted to approach the support member momentarily beyond the point at which the valve disc closes the vent passage in order to accommodate peak load forces.

Load and support members will not contact each other, however; only the cavity seal ring will move further into its support cavity in one of the load and support members while it remains in sealing contact with the other member, and while the seal disc, being pressed onto the vent opening with greater force, causes damping of the load member movement toward the support member.

DESCRIPTION OF THE PREFERRED EMBODIMENTS

Figure 1:
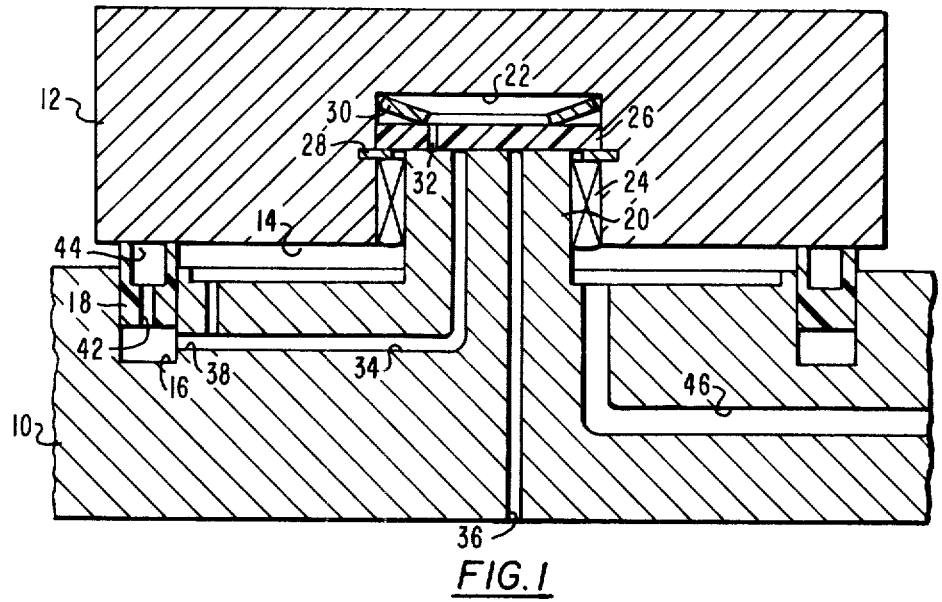
FIG. 1 shows in cross-section one embodiment of a hydrostatic axial thrust bearing according to the invention.
Figure 2:
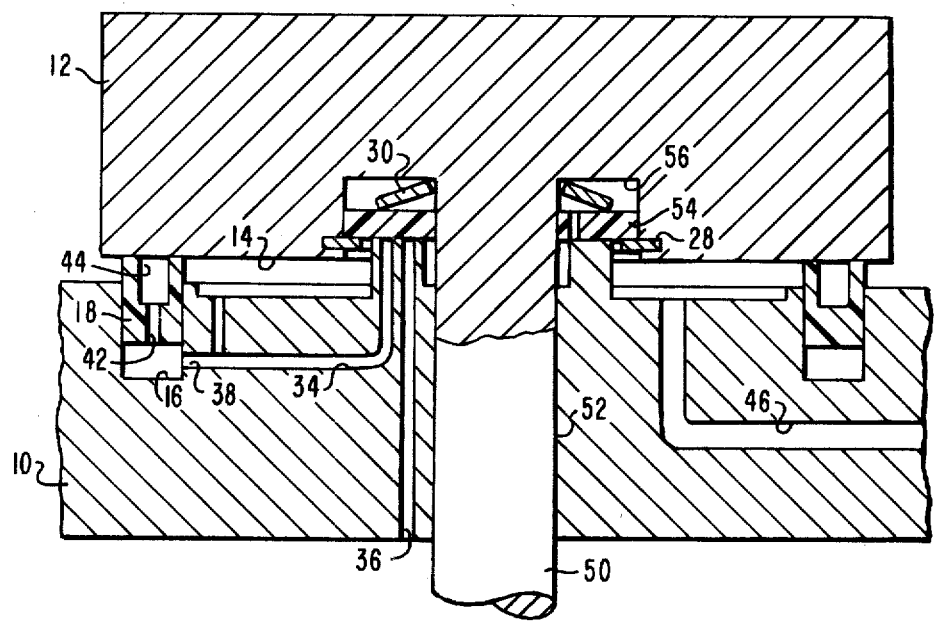
FIG. 2 shows another embodiment of the invention.

As shown in FIGS. 1 and 2 in which functionally identical parts have the same number, there is a bearing support member 10 which carries a bearing load member 12 with a cavity 14 formed between the bearing support and load members 10 and 12. The support member 10 has an annular groove 16 with a seal ring 18 floatingly disposed therein defining the radial outer limits of the bearing cavity 14. In the arrangement as shown in FIG. 1, the support member 10 has a central projection 20 extending into a cavity 22 in the load member 12, the load member 12 being radially supported thereon by roller bearing 24 preventing also tilting of the load member on the support member. A valve disc 26 is disposed in the cavity 22 and held in its end position by a spring ring 28 into which end position it is forced by a Belleville spring ring 30. The valve disc 26 has a passage 32 to provide for communication between the bearing cavity 14 and the rear area of the valve disc 26. A communication passage 34 extends from the bearing cavity 14 to an area below the valve disc 26 and a vent passage 36 extends from the area below the valve disc 26 to discharge. The area behind the seal ring 18 in the cavity 16 is also in communication with the bearing cavity by means of passage 38 to permit movement of the seal ring and the seal ring 18 has a passage 42 to supply pressurized fluid to the groove 44 formed in the seal ring face from the bearing cavity 14. Pressurized fluid is supplied to the bearing cavity 14 through the fluid supply passage 46.

During normal load operation, the valve disc 26 will always be held in engagement with the disc support ring 28 which may slightly lift off the valve disc 26 to permit excess fluid to be discharged through vent passage 36. Only when sudden load peaks occur, the valve disc 26 is unseated from the disc support ring 28 against the force of the Belleville spring 30 which increases the valve disc closing force thereby permitting less fluid to be discharged through the vent 36 and damping the movement of the load member toward the support member increasingly the closer the load member approaches the support member.

As shown in FIG. 2 the load member 12 has a shaft 50 which extends through a passage 52 in the support member 10 for axial support and alignment. The valve disc 54 is therefore annular and it is disposed in an annular cavity 56, otherwise the arrangement is the same as that shown in FIG. 1. Also, operation of the arrangement shown in FIG. 2 is the same as described above for FIG. 1.

What I claim is:

1. A hydrostatic axial thrust bearing comprising: a support member; a load member disposed opposite said support member with a bearing cavity formed therebetween, said load member having a central cavity, a valve disc seated in said cavity and being axially movable therein, spring means disposed in said cavity and forcing said valve disc into a seated position, said support member having a vent passage extending therethrough and having an opening below said valve disc, a bearing cavity seal ring disposed in a groove formed in one of said support and load members and being axially movable therein, said seal ring defining the circumferential limits of said bearing cavity, and means for admitting pressurized fluid to said bearing cavity to support said load member on said support member, said load member lifting said valve disc off said vent opening for discharging excessive amounts of fluid from said bearing cavity and said spring means providing increased vent closing forces while the valve disc is unseated during sudden load peaks so as to dampen peak bearing load forces while permitting limited movement of the load member toward the support member beyond the normal operating position.

2. A bearing as recited in claim 1, wherein said support member has a central projection extending into said central cavity in said load member and a bearing is mounted on said central projection for radially supporting said load member on said support member, said valve disc being disposed axially adjacent the face of said central projection.

3. A bearing as recited in claim 2, wherein a communication passage extends from said bearing cavity to the face of said central projection and a vent passage extends from said face to a discharge.

4. A bearing as recited in claim 3, wherein said valve disc is seated on a support ring disposed in a groove formed in the walls of said cavity and said spring means is a Belleville spring arranged behind the valve disc.

5. A bearing as recited in claim 1, wherein said load member has a shaft extending through a central opening in said support member, said valve disc and said spring means being disposed in an annular recess formed in said load member around said shaft.

6. A bearing as recited in claim 5, wherein said support member has an annular projection extending into said annular recess and said valve disc is annular and disposed on the face of said annular projection.

7. A bearing as recited in claim 6, wherein a communication passage extends from said bearing cavity to the face of said annular projection and a vent passage extends from said face to discharge.

8. A bearing as recited in claim 7, wherein said annular valve disc is seated on a support ring disposed in a groove formed in the walls of said annular recess and said spring means is a Belleville spring arranged behind said annular valve disc.

* * * * *